United States Patent [19]
Hargis

[11] Patent Number: 5,854,546
[45] Date of Patent: Dec. 29, 1998

[54] SUPPRESSION OF RADIO FREQUENCY EMISSIONS

[75] Inventor: Colin Hargis, Bwlchyddar, United Kingdom

[73] Assignee: Control Techniques PLC, Powys, United Kingdom

[21] Appl. No.: 537,806

[22] PCT Filed: Mar. 2, 1995

[86] PCT No.: PCT/GB95/00442

§ 371 Date: Nov. 1, 1995

§ 102(e) Date: Nov. 1, 1995

[87] PCT Pub. No.: WO95/24763

PCT Pub. Date: Sep. 14, 1995

[30] Foreign Application Priority Data

| Mar. 8, 1994 | [GB] | United Kingdom | ................... 9404468 |
| Sep. 9, 1994 | [GB] | United Kingdom | ................... 9418186 |
| Feb. 22, 1995 | [GB] | United Kingdom | ................... 9503527 |

[51] Int. Cl.⁶ .................................................. H02H 07/08
[52] U.S. Cl. .......................... 318/458; 318/629; 318/623; 318/611; 310/51; 257/665; 32/58
[58] Field of Search ............................... 310/42, 112, 51; 318/458, 623, 629, 611, 520, 492; 257/665; 322/58; 128/901; 361/107

[56] References Cited

U.S. PATENT DOCUMENTS

| 3,731,127 | 5/1973 | Harrington | ................................ 310/254 |
| 4,049,984 | 9/1977 | Ishii et al. | ................................ 310/42 |
| 4,329,605 | 5/1982 | Angi et al. | ................................ 318/72 |
| 4,450,373 | 5/1984 | Miller et al. | ............................... 310/51 |
| 4,543,507 | 9/1985 | Heyraud . | |
| 4,566,029 | 1/1986 | Johnson | .................................... 358/50 |
| 4,779,031 | 10/1988 | Arrends et al. | ......................... 318/565 |
| 5,006,744 | 4/1991 | Archer et al. | ............................. 310/89 |
| 5,021,725 | 6/1991 | Jimbo et al. | ............................ 318/801 |
| 5,026,476 | 6/1991 | Ishimoto et al. | ......................... 310/51 |
| 5,080,559 | 1/1992 | Wright et al. | ............................. 322/58 |
| 5,097,163 | 3/1992 | Shah et al. | ............................... 322/58 |
| 5,515,230 | 5/1996 | Ashley | .................................... 361/107 |
| 5,598,029 | 1/1997 | Suzuki | .................................... 257/665 |
| 5,632,351 | 5/1997 | Ishiyama | ................................ 180/651 |

FOREIGN PATENT DOCUMENTS

| 1613343 | 12/1977 | Germany . |
| 1075354 | 2/1984 | U.S.S.R. . |
| 1249723 | 8/1986 | U.S.S.R. . |
| 2020118 | 11/1979 | United Kingdom . |
| 2070341 | 9/1981 | United Kingdom . |
| 2151413 | 7/1985 | United Kingdom . |
| 2268343 | 5/1994 | United Kingdom . |

*Primary Examiner*—John W. Cabeca
*Attorney, Agent, or Firm*—D. Peter Hochberg

[57] ABSTRACT

For the suppression of radio frequency emissions from an electrical drive comprising an electric motor supplied with electrical power via an electronic controller having a high speed switching device which generates high frequency energy, an electrical screen is provided to receive the radio frequency energy and is connected back to the input side of the high speed switching device.

26 Claims, 8 Drawing Sheets

SUPPRESSION OF RADIO FREQUENCY EMISSIONS

FIELD OF INVENTION

This invention relates to a method for suppression of the emission of radio frequency energy from an electrical drive comprising the combination of an electronic controller and an electric motor, and to an electrical drive adapted to operate in accordance with the method of the invention.

BACKGROUND OF INVENTION

The control of operating characteristics such as the speed or torque of an electric motor commonly is achieved by use of an electronic controller which incorporates a semiconductor or other solid state device arranged to operate in a high speed switching mode. An example of an electronic controller of this type is a pulse width modulation (PWM) inverter.

Said high speed switching mode devices are employed in a range of types of electrical drive, e.g. for the control of AC inverter drives with permanent-magnet motors, induction and reluctance motors, servo drives having AC or DC motors and also switched reluctance motors. By the use of a high speed switching mode type of controller it is possible to achieve various desired operating features such as smooth control of the output power or torque of an electric motor without a significant loss of electrical energy.

The benefit of the flexibility in control of an electric motor which can be achieved by the use of a high speed switching mode electronic device does, however, result in the generation of high levels of radio frequency energy which potentially can enter the surrounding environment to cause unacceptable disturbance to neighbouring equipment. In some cases that disturbance can have potentially dangerous consequences. This has resulted in stringent regulations, such as the Electromagnetic Compatibility Directive 89/336/EEC, which are now established to ensure that new equipment, and its installation, will not result in potentially hazardous levels of radio frequency emissions.

The reduction of radio frequency emissions from electrical drives so that they lie within acceptable limits may be achieved by the use of an electrical filter, but a suitable filter commonly is unduly expensive or bulky. Also, with an AC power supply the filter causes some earth leakage current, which presents an electrical safety problem and may cause protective devices to operate prematurely. Other conventional techniques such as arranging that circuits liable to generate radio frequency emissions should be deliberately coupled to earth or provided with an earthed screen are either not possible or not effective in power circuits where the earth and the power system are required for safety reasons to be electrically separate.

The present invention seeks to provide an improved method for the suppression of radio frequency emissions from an electrical drive, and an electrical drive adapted to operate in accordance with the method of the invention.

SUMMARY OF INVENTION

In accordance with one of its aspects the present invention provides a method for the suppression of radio frequency emissions from an electrical drive of the kind comprising an electronic controller comprising high speed switching means which generates high frequency energy and an electric motor to which power from a source of electrical power is supplied via said electronic controller, said method comprising providing an electrical screen to receive radio frequency energy which, in use, is emitted from at least a part of the electrical drive and electrically connecting said electrical screen back to the input side of said switching means.

The method may comprise use of an electrical screen of a kind which substantially wholly surrounds at least a part of the electrical drive from which, in use, radio frequency energy is emitted. Preferably use is made of an electrical screen which, at the least, substantially wholly surrounds at least a part of the electric motor.

The invention provides also an electrical drive comprising an electronic controller comprising high speed switching means which generates high frequency energy, and an electric motor to which power from a source of electrical power is supplied via said electronic controller, wherein, in use, radio frequency energy which is emitted from at least a part of the electrical drive is received by an electrical screen which is connected back to the input side of said switching means.

Preferably said electrical screen, connected back to the input side of said switching means, serves at the least to receive radio frequency energy which is emitted by at least a part of the electric motor. Optionally, but more preferably, it may serve also to receive radio frequency energy emitted by the electronic controller.

In at least this aspect the present invention may be regarded as relating to an electrical drive in the form of a system in which there is a two-way interaction between an electric motor and an electronic controller which incorporates high speed switching means, the motor being operable by a controlled supply of electrical energy received from the electronic controller and related to operation of the high speed switching means, and radio frequency energy emitted from within the electric motor and received by an electrical screen associated with the motor being fed back to the electronic controller, to the input side of the high speed switching means.

The electrical screen may be comprised by a conventional part of the electric motor such as the stator and/or frame and/or rotor, and/or by a conventional part of the electronic controller, provided that it is practicable and safe for said conventional part not to be connected to earth. For example, electrical windings may lie in a component (e.g. a stator or rotor core) which may be devoid of an intervening screen and that component may be utilized at least in part as the electrical screen. The electrical screen alternatively may be comprised by an additional member provided within or otherwise operatively associated with the electrical drive for receiving radio frequency energy from at least a part of said drive. Thus the electrical screen may comprise structure which serves as a screen and also performs another function for operation of the electrical drive or it may comprise structure which is provided solely to act as said electrical screen.

The invention embraces an electrical drive having an electric motor in which one or more of the conventional parts of the motor and/or one or more additional members provided for a screening function is/are employed either alone or in combination with one or more other of said conventional parts and additional member(s) to provide screening for the windings in the motor.

The invention teaches that the electrical screen is to be connected back to the power supply to the controller or to the electronic controller at a point which is at an input side of the high frequency energy generating device in the controller and that in consequence stray radio frequency current coupled to the screen and returned to the electronic controller or power supply is prevented from flowing into the power supply or an earth or grounded (earth and grounded are used interchangeably herein) system. Radio frequency energy is recirculated through the controller and the need for conventional filtering is avoided or at least reduced.

The invention teaches furthermore than in an electrical drive comprising an electronic controller and an electric motor at least the electric motor may be devoid of an earthed screen. The electronic controller similarly may be devoid of an earthed screen. Any interconnection means, such as a controller output cable, provided between the electronic controller and the electric motor also may be devoid of an earthed screen. Preferably any such interconnection means as well as the electric motor (and optionally also the electronic controller) is provided with a screen arranged such that radio frequency current can be fed back from the screen to the power supply or electronic controller at a point which is at an input side of the high frequency energy generating device in the controller.

The electrical drive may comprise a plurality of screen sections. The sections may be interconnected in series or parallel for connecting back to the input side of the high speed switching means; there may be a combination of series and parallel interconnections. One or more of the screen sections may be provided with a plurality of connections to another part of the screen.

Capacitor means may be provided between said electrical screen and the electronic controller or an external power supply to said controller thereby to ensure that the electrical screen is not connected directly to the external power supply or any other electrically live point. The capacitor means may be part of a circuit forming the electronic controller or it may be external thereof. In either case it serves as blocking means to prevent the screen from attaining a high potential from the power circuit, whilst permitting the free flow of radio frequency current.

The capacitance value of said capacitor means preferably is selected to result in presentation of a low impedance at the frequencies associated with radio frequency emissions, but a high impedance at the frequency of the external power supply. A bleed resistor connected to earth may be associated with said capacitor means so that the power-frequency induced potential present on the electrical screen is kept small and without any significant radio frequency current being allowed to flow direct to earth.

The invention is believed to be particularly useful for the suppression of radio frequency emissions in the range 150 kHz to 1 GHz but may be employed for the suppression of radio frequency emissions over a broader range such as from e.g. 9 kHz to 2 GHz or above.

The high speed switching means may be of a kind which has a switching time typically in the range 50 ns to 2 $\mu$s and operating at a switching frequency in the range 300 Hz to 20 kHz. However high speed switching means having a switching time outside that range, e.g. a faster speed of down to 20 ns or even 10 ns may be employed and may be caused to operate at a higher frequency such as in the order of 25 kHz or up to 100 kHz or above.

The high frequency energy generated by the high speed switching means typically will be at a frequency higher than the frequency inherently and intentionally generated by the circuit design of the electronic controller and that higher frequency may fall within a wide frequency range that includes radio frequencies. The high frequency energy may arise at a frequency which is a harmonic of the switching frequency of the high speed switching means, e.g. because of a non-sinusoidal variation of voltage and current.

The electronic controller may be of a kind having an intermediate frequency stage, which may, for example, be a DC stage.

In the case of an electronic controller having two or more stages of which a first does not generate high frequency energy, the screen may be connected back to a point which is between those stages and is at the input side of the stage(s) which generate high frequency energy.

Particularly if a motor frame is not available for use as at least a part of the electrical screen, for example because it needs to be connected to earth, the screen may comprise an electrically conductive layer incorporated between and insulated electrically from the motor windings and at least some of the associated motor structure such as a frame, stator core, or rotor part of the motor relative to which said motor windings are located. Thereby, in accordance with the present invention, coupling of radio frequency energy from the motor windings to the motor frame (e.g. an earthed frame) is suppressed significantly in comparison with a conventional configuration devoid of any such electrically conductive layer in that location.

The electrical screen between a motor winding and part of the electric motor may be of a laminated construction. It may comprise a layer of electrically conductive material sandwiched between two layers of insulating material.

As considered in transverse cross-section in a plane perpendicular to the length of a motor winding, the electrical screen preferably is arranged to wholly surround that motor winding. The winding and said screen may lie substantially wholly within a slot in the motor. The windings in each of a plurality of slots in a stator or other part of a motor preferably are each surrounded by an electrical screen. Screens for the windings in the slots may be electrically interconnected for example by virtue of at least a part of each screen extending lengthwise out of a slot end so that a bared part of one screen is in electrically conductive contact with a bared part of another screen. The need to provide a wire interconnection thereby may be avoided.

An end-winding screen may be provided for screening of the end-winding from the frame and/or from other parts of the motor such as the rotor.

Each of the motor windings in the slots of a stator or a rotor may be surrounded by a screen of, for example, a sleeve-like form; the sleeve may be fabricated from laminated material comprising an electrically conductive layer arranged adjacent a layer of insulating material or sandwiched between two layers of insulating material. Alternatively, the windings may be screened by an existing part of the motor structure and an additional member. The windings in the slots of a stator, or rotor, may be screened in part by the structure of the stator or rotor core and in part by a covering screen, e.g. of strip-like form, which extends over that part of the windings not adjacent the motor slot. That covering screen may be in electrical contact with the stator or rotor core via which it may be connected back to the input side of the high speed switching means, or it may be separately connected. The covering screen may be of a laminated construction as described herein in respect of a screen of sleeve-like form, and it may be retained in position by a slot wedge. In a further variation the slot wedges may be of electrically conductive material and may be utilized to perform a screening function.

From the foregoing it will be understood also that the present invention provides but is not limited to an electric motor in which an electrical screen is positioned between the windings and at least some of the remaining structure of the motor, such as the frame or stator or rotor part of the motor. In accordance with the aforedescribed aspects of the invention, that electrical screen preferably is connected to an electronic controller provided for controlling operation of the motor.

Whilst 3-phase AC induction motors are commonly used and the present invention may be applied in relation to motors of that type, the invention is not limited in its application to any specific type of AC or DC motor. Thus, it may be applied, for example, to other motors, such as AC permanent magnet motors and reluctance motors.

The invention may be applied to an electric motor and to an electrical drive having an electric motor of a kind which operates from an AC supply of any number of phases, or from a DC supply. It is applicable in any situation where the supply has a separate earth connection which is not permitted to be connected to one pole of the supply at the equipment, i.e. the supply at the electrical drive.

The electrical drive of the present invention may comprise an electronic controller of a kind in which an electrical screen (hereinafter referred to as a controller screen) is provided in proximity to the high speed switching means of the controller to receive radio frequency energy generated by said switching means and wherein said controller screen is connected to the input side of said switching means.

It is particularly preferred that the controller screen is located in proximity to terminals of the high speed switching means, e.g. to lie between (any) such terminals and earth.

The high speed switching means may be a solid state device. It may be of a kind mounted on a heat sink and in that case it is provided by the present invention that a controller screen shall be interposed between the high speed switching means and the heat sink.

In the case of an electronic controller of a type in which the high speed switching means is insulated electrically from a heat sink by a layer of insulating material, the controller screen may be a layer of electrically conductive material which is embedded in that layer of insulating material or sandwiched between that layer and an additional layer of insulating material. A controller of this type may have an electrically conductive housing for the high speed switching means and that housing may be connected to a terminal such as a power input terminal of the controller.

The high speed switching means may be of a type having a base plate which is electrically insulated internally from that part of the high speed switching means which generates radio frequency energy. In that case the controller screen may be comprised by said base plate. A layer of electrically insulating material may be provided between the base plate screen and the heat sink. Alternatively the controller screen may be a layer of electrically conductive material embedded in a layer of insulating material provided internally between the base plate and the part of the high speed switching means which, in use, generates radio frequency energy or it may be sandwiched between that layer of insulating material and an additional layer of insulating material.

The controller screen may be in the form of a barrier layer which provides a physical barrier to the direct transmission of radio frequency energy from the high speed switching means to the heat sink or, for example, to another and typically earthed component. Alternatively the controller screen may be of a kind which surrounds, i.e. substantially wholly contains, the high speed switching means.

The electronic controller may be of a type in which the high speed switching means is connected directly to a heat sink such that the heat sink may be electrically live. In the case of an electronic controller of this type the present invention provides that the high speed switching means shall be insulated electrically from the heat sink and that the heat sink shall be connected to the power input of the switching means in a configuration in which the heat sink acts as a controller screen.

The present invention further teaches that the controller screen is to be connected to the electronic controller at a position which is on the power input side of the high speed switching means. That connection may be to the power input terminal of a controller which employs direct switching from the power line, or one pole of the DC link in the case of an electronic controller which uses a rectifier followed by an inverter.

The connection between the controller screen and electronic controller power input may be effected via a capacitor the capacitance of which is chosen to present a low impedance at the radio frequencies of concern, but a high impedance at the power supply frequency to the electric motor. A resistor may be connected between the controller screen and earth to prevent a build-up of static potential.

One capacitor may be interposed between the input side of the high speed switching means and two or more screen sections which comprise the electrical screen of the electrical drive, e.g. sections associated with one or more of the controller, motor and any interconnecting cable, and similarly, one or more sections of a motor screen section if that is of a multi-part form.

BRIEF DESCRIPTION OF THE DRAWINGS

Embodiments of the invention will now be described, by way of example only, with reference to the accompanying diagrammatic drawings in which.

DETAILED DESCRIPTION OF PREFERRED EMBODIMENTS

Figure 1:
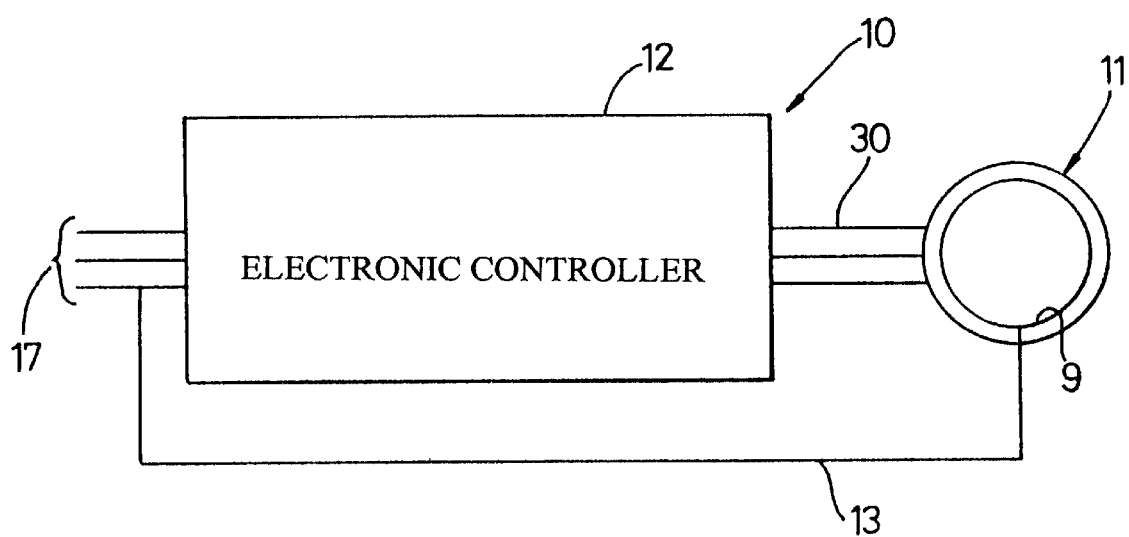
FIG. 1 shows in outline an electrical drive in accordance with a first embodiment of the present invention.

An electrical drive (10) (see FIG. 1) comprises, in the example of this embodiment of the invention, a three-phase AC induction motor (11) having a rotor (22) the speed of which is controlled by an electronic controller (12) which may be of a type known per se. The controller (12) is connected to an external three-phase power supply (17).

The motor (11) is of a special construction which incorporates an electrical screen described in more detail below.

In contrast to a conventional configuration in which, typically, the frame of an electric motor is connected directly to earth, and results in a flow of radio frequency current to earth, in this embodiment of the present invention the motor (11) optionally may have a connection to earth for the purpose of ensuring electrical safety, but any such connection does not carry radio frequency current. Instead, the motor has, internally of the motor frame, an electrical screen (9) which is connected to the electronic controller (12) via a connector (13) whereby stray radio frequency current coupled to the screen is returned to controller and is prevented from flowing into the earth system. The connection of connector (13) is to the power input to the controller and thus to the input side of a high speed switching device which forms at least a part of that controller.

Figure 2:
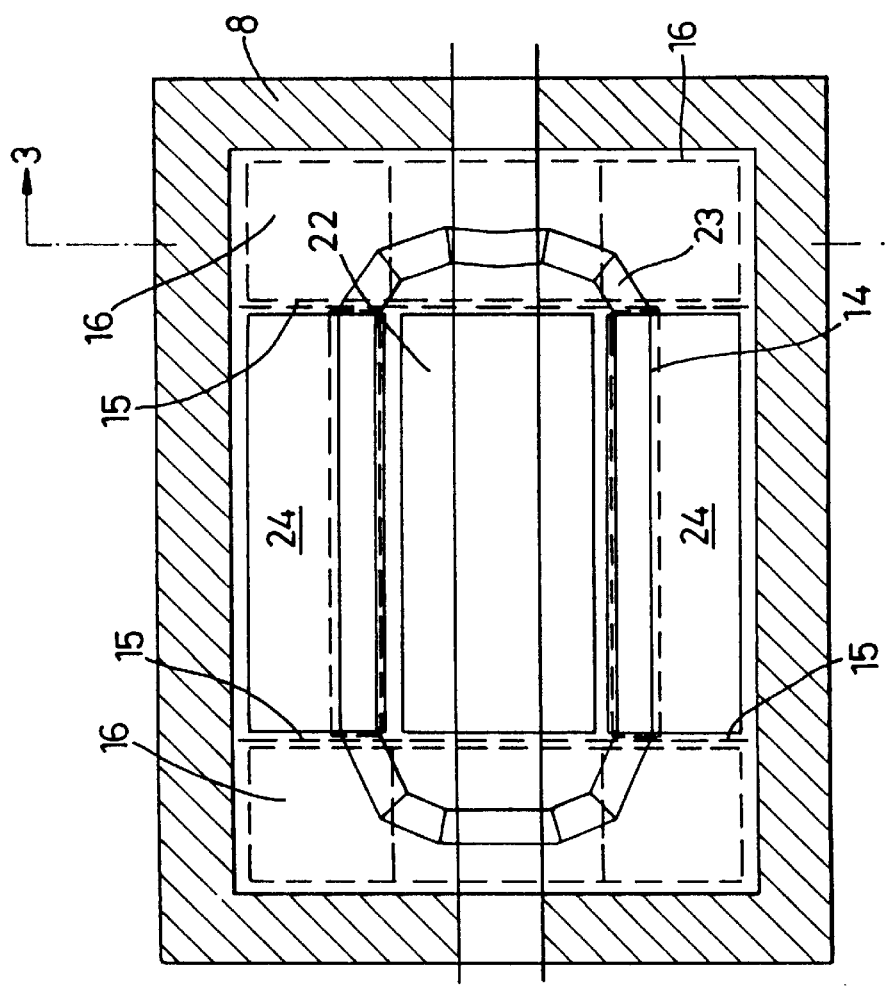
FIG. 2 is a longitudinal sectional view of the motor of FIG. 1.

The motor electrical screen (9) comprises three motor screen sections all within the motor frame (8), these sections (see FIG. 2) being:

(i) a screen assembly (14) for the windings (23) located in slots (19) in the stator (24);

(ii) laminated end screens (15) for the ends of the stator core; and (iii) conductive winding end-cap screens (16).

Figure 4:
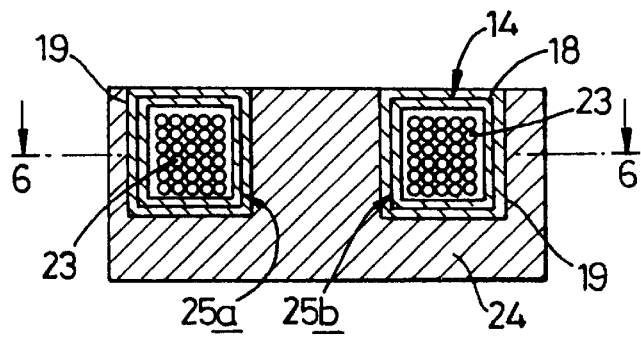
FIG. 4 is a transverse section of stator windings in the motor of FIG. 1.

The screen assembly (14) (see FIGS. 4 and 5) comprises sleeve-like formations (18) which wholly surround the windings (23) in the stator core slots (19) and extend along the full length of each slot.

Figure 5:
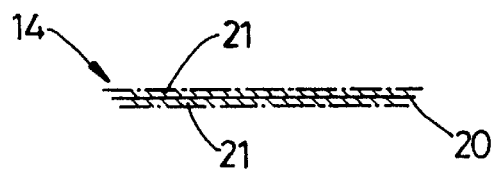
FIG. 5 shows in detail the electrical screen shown in FIG. 4.

As most clearly seen in FIG. 5, each screen (14) is of a laminated construction comprising a layer of an electrically conductive material (20) sandwiched between two layers of insulating material (21). This screen (14) is used in place of, rather than additional to, the normal single layer of insulating material usually provided as a lining in stator slots.

Figure 6:
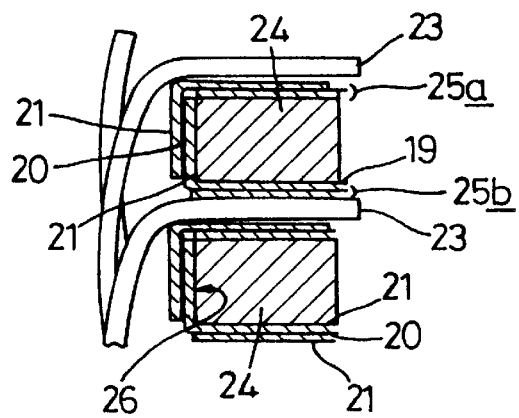
FIG. 6 is a section on the line 6—6 of FIG. 4.

Each screen (14) extends lengthwise beyond the ends of a respective slot (19) so that the ends of neighbouring screens (14) may be electrically interconnected in the manner shown in FIG. 6. Thus, at the ends of a pair of neighbouring slots (19), outwards of the slots, the neighbouring side wall portions (25*a*, 25*b*) of the sleeves (14) each have a layer of the electrical insulation material (21) removed to expose the layer of conductive material (20). An inner insulation layer (21) {i.e. a layer closest to a winding (23)} is removed from one (25*b*) of the pair of neighbouring side walls and an outer insulation layer (21) is removed from the other side wall (25*a*) of the pair. Thus, when the bared side wall ends are folded flat against an end face (26) of the stator core there results, at that end face, a sandwich arrangement of two layers of conductive material (20) in direct contact and laying between an insulating layer (21) of one side wall (25*a*) and an insulating layer (21) of the other side wall (25*b*) of the neighbouring pair.

Figure 7:
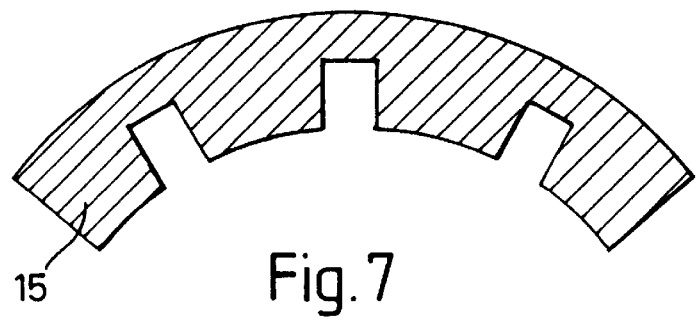
FIG. 7 is a view of a detail of the end of the stator core part of the motor of FIG. 1.

FIG. 7 shows part of one of a pair of screened end-plates (15) each for providing screening between the stator core and an end-winding. The plate (15) may have an electrical screen constructed as described above with reference to FIG. 5. Depending on insulation requirements the layer of conducting material (20) may be placed on one surface of the plate or it may be incorporated in the structure of the plate.

Figure 3:
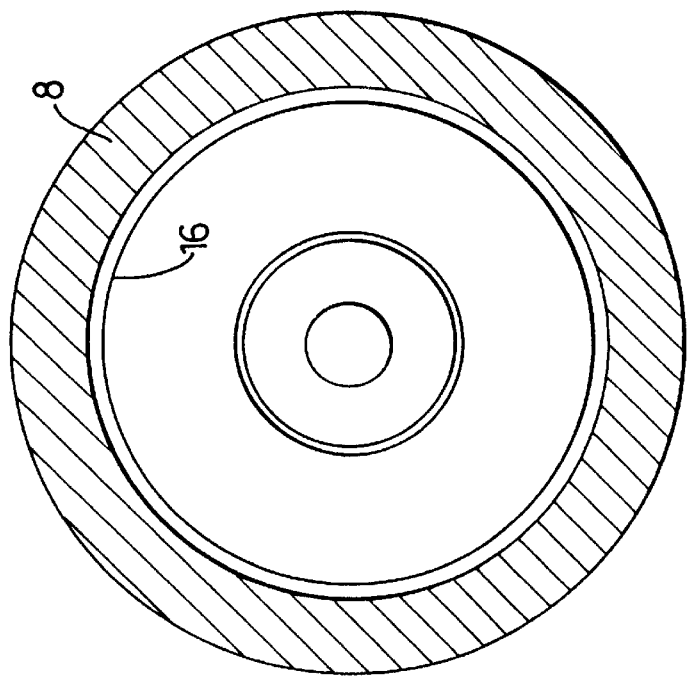
FIG. 3 is a simplified section on the line 3—3 of FIG. 2.

Each conductive winding end-cap screen (16) (see FIGS. 2 and 3) also may be constructed substantially as described above with reference to FIG. 5. Depending on insulation requirements the conducting film may be placed on one surface of the cap or may be incorporated as an internal layer. The end-cap screens (16) provide screening between the end-windings and the motor casing (8).

In the aforedescribed construction each of the screen sections is comprised by a component which is either additional to the standard, conventional components of the motor, or is a substitute component, as in the case of the screen assemblies (14) for the windings (23) and which are provided instead of the standard single layer of insulating material between the windings and stator core.

Figure 8:
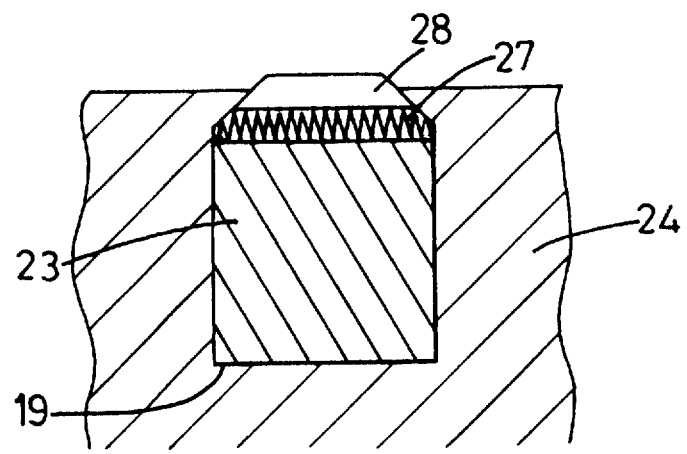
FIG. 8 illustrates a variation of one of the screen sections of the embodiment of FIGS. 1–7.

In an alternative embodiment, now described with reference to FIG. 8, a standard, conventional part of the motor is used to provide, at least in part, one of the screen sections. The motor is constructed in a manner substantially similar to that of the motor (11) described above with reference to FIGS. 1 to 7. However, instead of providing each winding in a stator core slot with a screen (14) (see FIG. 4) of a laminated and sleeve-like construction, the stator core (24) is employed to provide a part of that screen section and conventional insulating material (not shown) is provided between the windings and stator core. As in the case of the motor (11), insulation is provided between the stator core and the frame, the frame typically being connected to earth. Screens are also provided over the end windings, corresponding to the screens (16) of FIG. 2. By connecting the stator core back to the input side of the high speed switching device of the controller (12), the base and side walls of each slot (19), as viewed in cross-section in FIG. 8, serve to screen three sides of each winding. The fourth, radially inner side of each winding (23) near the mouth of a respective slot (19) is screened by a strip-like conducting screen (27) arranged with its longitudinal edges in electrical contact with respective side walls of the slot. The screen (27) is held in position by a slot wedge (28), insulated in conventional manner from the winding (23). The screen (27) is connected back to the controller via the stator core and therefore all four sides of the windings, as viewed in FIG. 8, are screened.

If the electronic controller (12) is not positioned adjacent the electric motor (11), such that an interconnecting cable (30) (see FIG. 1) is of a significant length and liable to emit radio frequency energy, that interconnecting cable may be provided with a screen. A connection of that screen to earth in a conventional manner would result in the capacitance between the power conductors of the cable (30) and the screen having the same effect of increasing radio frequency emission from the drive as the capacitance between the motor windings and an earthed part of the motor. To avoid or reduce that effect said screen around the cable (30) preferably is connected to the same part of the controller (12) as that to which the screen 9 of the motor is connected. It may connect via the aforedescribed connector (13).

Figure 9:
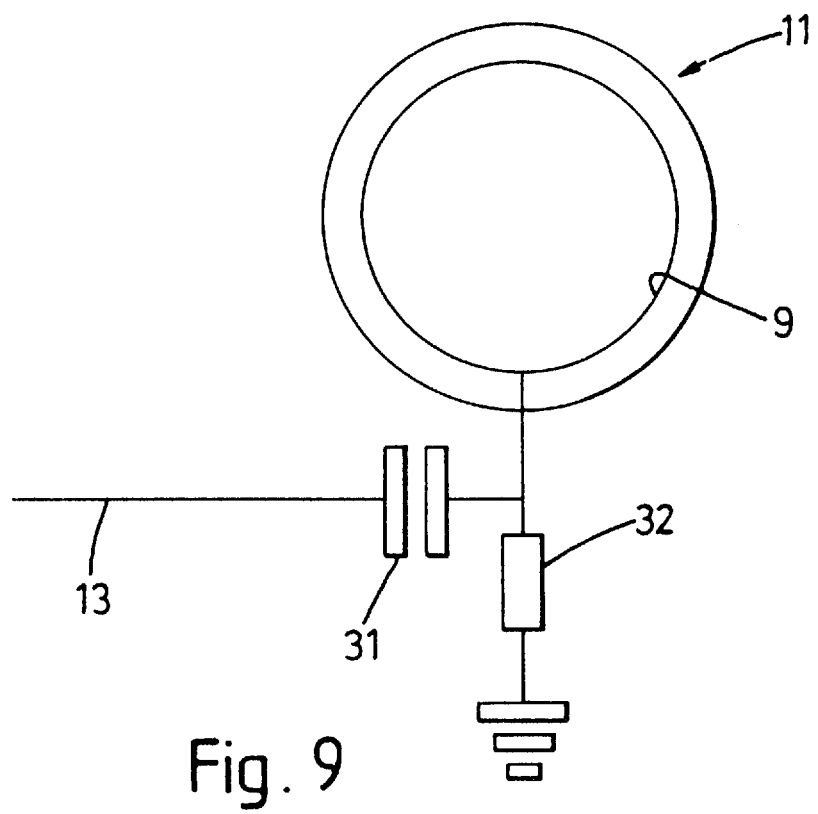
FIG. 9 illustrates an interconnection variation for the electrical drive of Figure 1.

Instead of a direct connection, the electrical screen of the motor (11) and/or any interconnecting cable (30) may interconnect with the controller (12) through a capacitor. One suitable arrangement is shown in FIG. 9. A capacitor (31) is incorporated in the connector (13). Optionally a bleed resistor (32) is provided, in this case between earth and the screen side of the capacitor, to ensure that the power frequency potential present on the screen is small, the value of the resistor being chosen also to ensure that no significant radio frequency current is connected to earth. The value of the capacitor (31) is chosen to present a low impedance at the frequencies associated with radio frequency emission and a high impedance at the power frequency.

In a second embodiment of the invention an electronic controller (40) (see FIG. 10) is of a type having an intermediate, DC frequency stage which incorporates a capacitor (45) (or two capacitors arranged in series instead of the single capacitor (45) if that is more appropriate having regards to relevant considerations such as, for example, voltage ratings). A first part (41) of the controller acts as a rectifier for a supply (39) and a second part (42) comprises an array of power transistors or other power switching devices which convert the DC into AC to drive an AC motor (43). The electrical screen (9') provided, substantially in the manner described above, in the motor (43) is connected back to the controller via connection (44) which, as illustrated, serves as a DC link between said parts (41, 42) and constitutes an input side to the high speed switching part (42).

Figure 10:
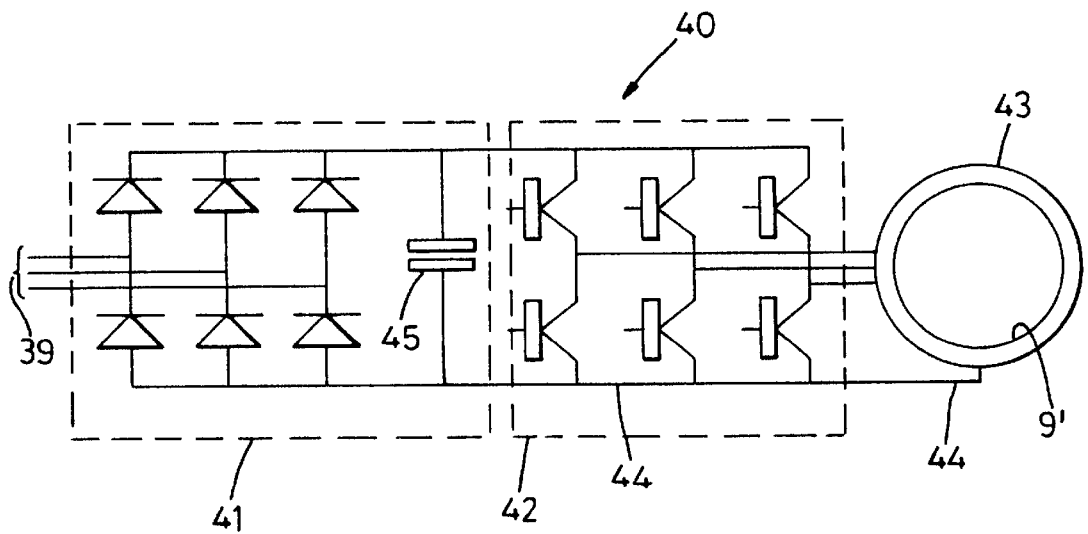
FIG. 10 shows in outline an electrical drive in accordance with a second embodiment of the present invention.

The connection (44) may provide a direct connection between the motor (43) and the controller (40) as shown in FIG. 10. Alternatively, the connection (44) may incorporate a capacitor (not shown) in a manner similar to that in which the capacitor (31) of FIG. 9 is incorporated in the connection (13) of FIG. 1. A capacitor introduced in the connection (44) of FIG. 10 similarly may have a capacitance value chosen to present a low impedance at the frequencies of radio emissions and a high impedance at the power frequency. Optionally a bleed resistor (also not shown) may be provided between earth and the screen side of a capacitor associated with the connection (44), in a manner similar to the provision of bleed resistor (32) in the arrangement of FIG. 9.

Figure 11:
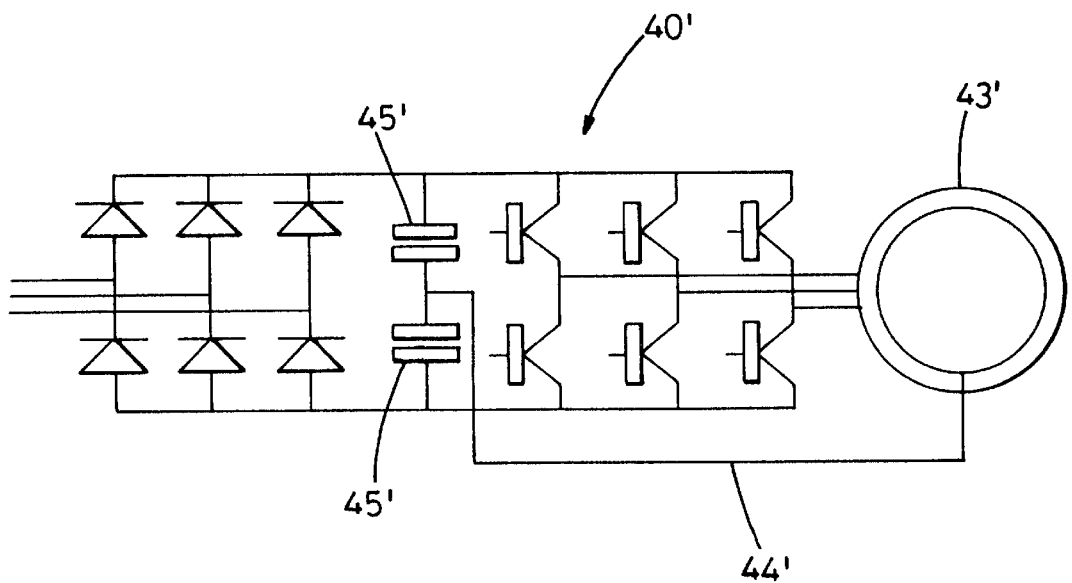
FIG. 11 shows in outline an electrical drive in accordance with a third embodiment of the present invention.

Another variation of the embodiment of FIG. 10 is shown in FIG. 11. The single inverter capacitor (45) of FIG. 10 is replaced by two capacitors (45') arranged in series in the controller (40'), and the connection (44') from the screen of the motor (43') leads to between those two capacitors (45'). There thereby results the benefit of the capacitor (31) of the FIG. 9 arrangement but without the need to provide an additional capacitor solely for that purpose.

In addition to providing that a motor screen (9) and optionally also the screen of an interconnecting cable (30) is connected back to the controller (12, 40) as aforedescribed, the controller may comprise a high speed switching device which similarly is screened from earth by a screen, referred to as a controller screen, that is connected to the controller at the input side of the high speed switching device.

The high speed switching device may comprise a semiconductor (50) (see FIG. 12) mounted on a base plate (51) which is externally insulated electrically from a heat sink (52) in a conventional manner by an interposed insulation layer (53). In accordance with the present invention an electrical screen (54) is provided between the base plate (51) and the heat sink (52). The controller screen is electrically insulated from the base plate (51) by the conventional insulation layer (53) and is insulated from the heat sink, which may be earthed, by an additional layer (55) of electrical insulation material.

The controller (12) may be of a kind which uses direct switching from the power line in which case (see FIG. 13) the controller screen (54) may be connected via connector (56) to a power input terminal (57) of the controller.

If the high speed switching device is of an internally insulated type in which a semiconductor (60) is insulated from a base plate (51) by an interposed layer (62) of electrical insulation (see FIG. 14), the base plate may be used as the controller screen (61) and an additional layer (63) of electrical insulation may be provided between to insulate the controller screen from the heat sink (64).

In another construction of a high speed switching device of an internally insulated type (see FIG. 15) the base plate (70) may be mounted directly on the heat sink (71) and the conventional single layer of electrical insulation between the semiconductor device (72) and to the base plate may be replaced by a sandwich arrangement of two layers (73, 74) of electrical insulation having sandwiched therebetween a single screen layer (75).

Figure 12:
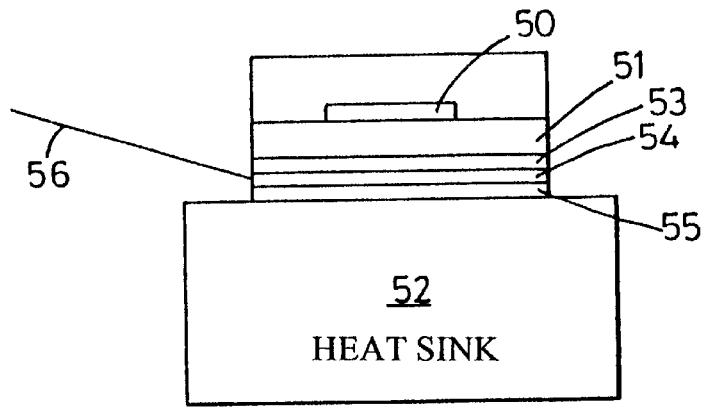
FIG. 12 shows part of a high speed switching device for use in an electrical drive of the present invention.
Figure 13:
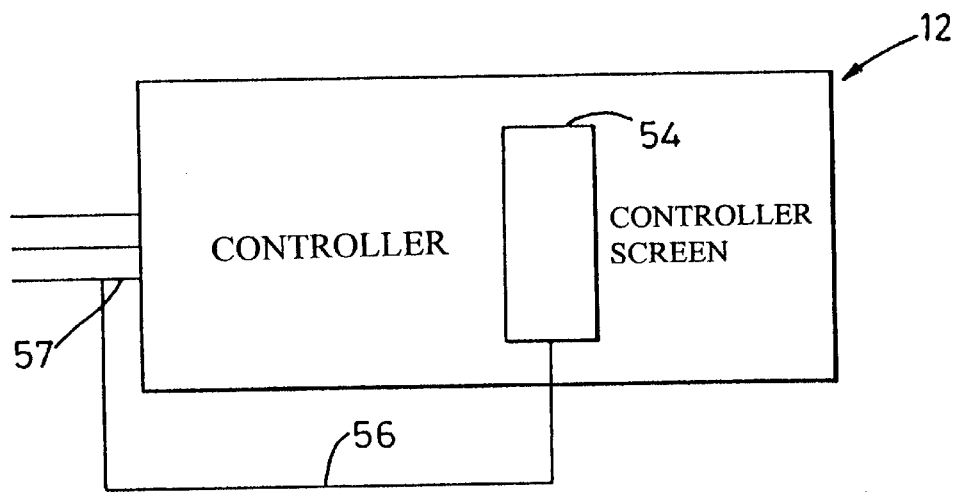
FIG. 13 shows an electronic controller incorporating the switching device of FIG. 12.
Figure 14:
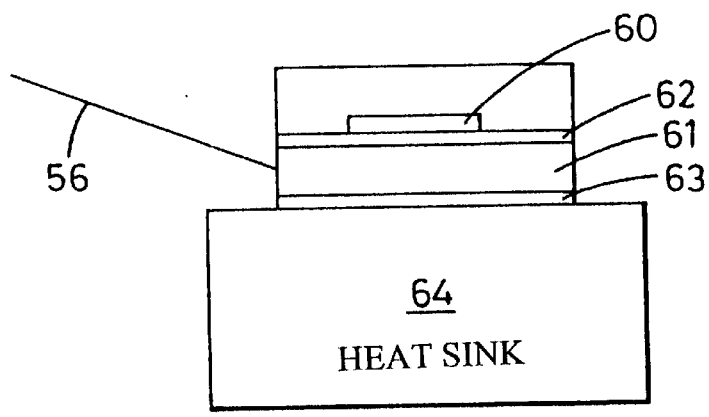
FIGS. 14 & 15 show alternative switching devices for use in the controller of FIG. 13.
Figure 15:
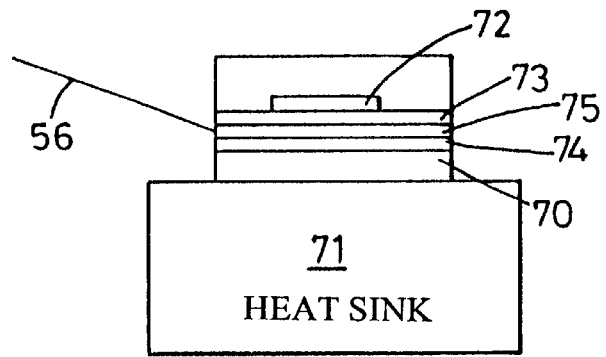

In the embodiments of FIGS. 14 and 15 the respective controller screens (61, 75) may be connected via connector (56) to a power input terminal (57) as aforedescribed with reference to FIGS. 12 and 13.

The controller may be of a kind as described with reference to FIG. 10 and having a rectifier part (41) followed by an inverter part (42). In that case the respective controller screens (54, 61, 75) of the high speed switching devices of FIGS. 12, 14 and 15 may be connected to one pole of the DC link as shown by FIG. 16.

Figure 16:
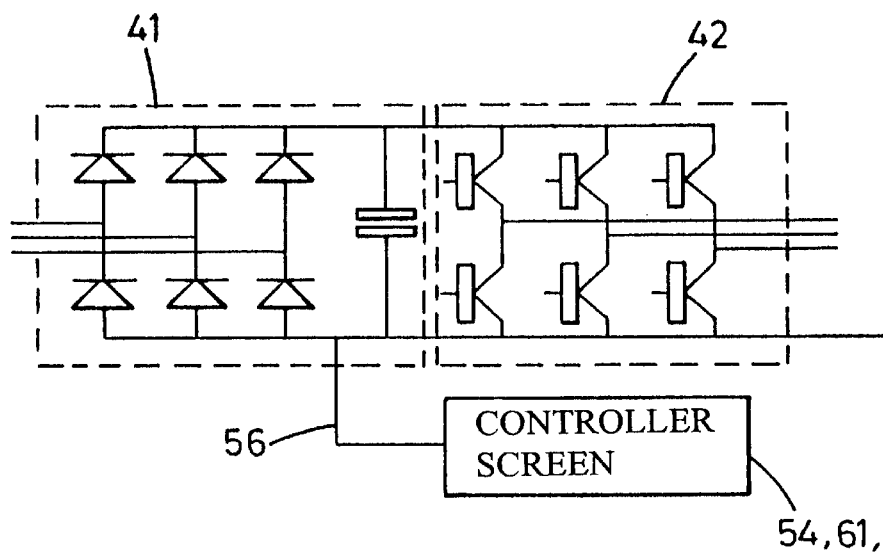
FIG. 16 shows another electronic controller which may incorporate the device of FIG. 12, FIG. 14 or FIG. 15.
Figure 17:
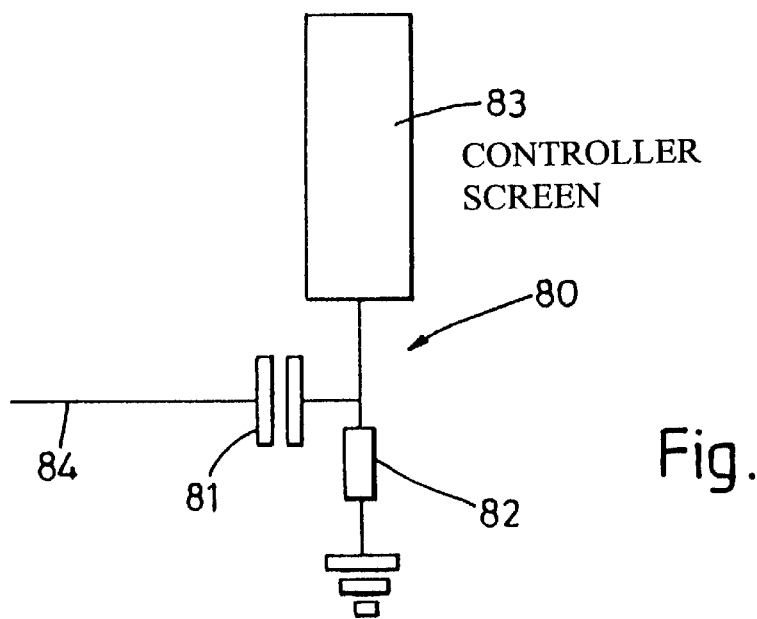
FIG. 17 shows an interconnection variation for the devices of FIGS. 12, 14 and 15.

The controller screen (54, 61, 75) may be connected directly to an input to the high speed switching device as shown in FIGS. 13 and 16 or it may interconnect through a capacitor. FIG. 17 shows a connection arrangement which incorporates a capacitor (81). The capacitor (81) lies between a connection (80) to a controller screen (83) and a connection (84) to the input to a high speed switching device (not shown). The capacitor (81) has a capacitance value selected to present a low impedance at the frequencies associated with radio frequency emission and a high impedance at the power frequency. A bleed resistor (82) is connected between the connection (80) and earth and serves to prevent a build-up of static potential.

Normally for electrical safety at least the frame of a motor needs to be connected to earth. However, this is not necessary in cases where it is practicable to provide sufficient electrical insulation around all accessible parts of the motor. In such cases the present invention teaches that it is not always necessary to provide the aforedescribed additional screening (14, 15, 16) within the motor and that the motor structure or appropriate parts such as the stator and/or frame and/or rotor may be connected to the controller so that stray radio frequency current coupled to that motor structure is fed back to the controller. That connection may be direct, for example as described with reference to FIG. 1 or FIG. 10, or it may be indirect, for example via a capacitor as described with reference to FIG. 9.

Figure 18:
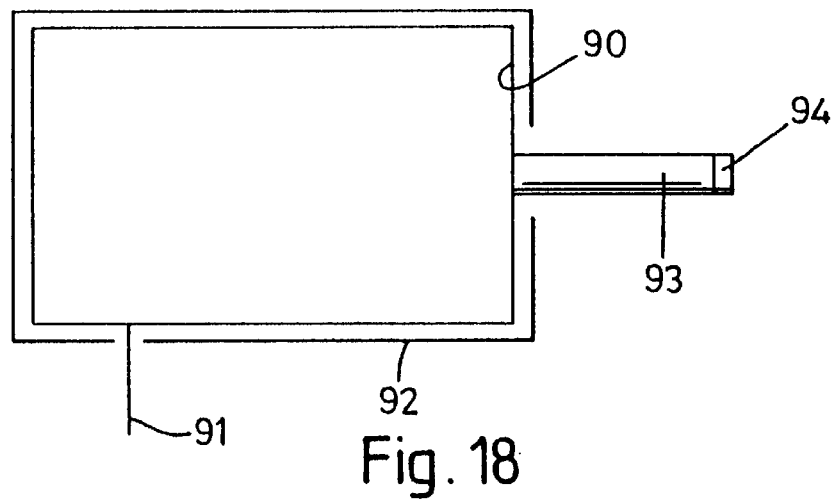
FIG. 18 shows part of an electrical drive in accordance with another embodiment of the invention.

FIG. 18 shows an example of an electrical drive in which the entire, conventional parts of a motor (90) are employed as a screen which is connected (91) back to the input side of the high speed switching means. Electrical insulation (92) isolates the motor from earth; the output shaft (93) also is provided with a section (94) that is an electrical insulator.

Figure 19:
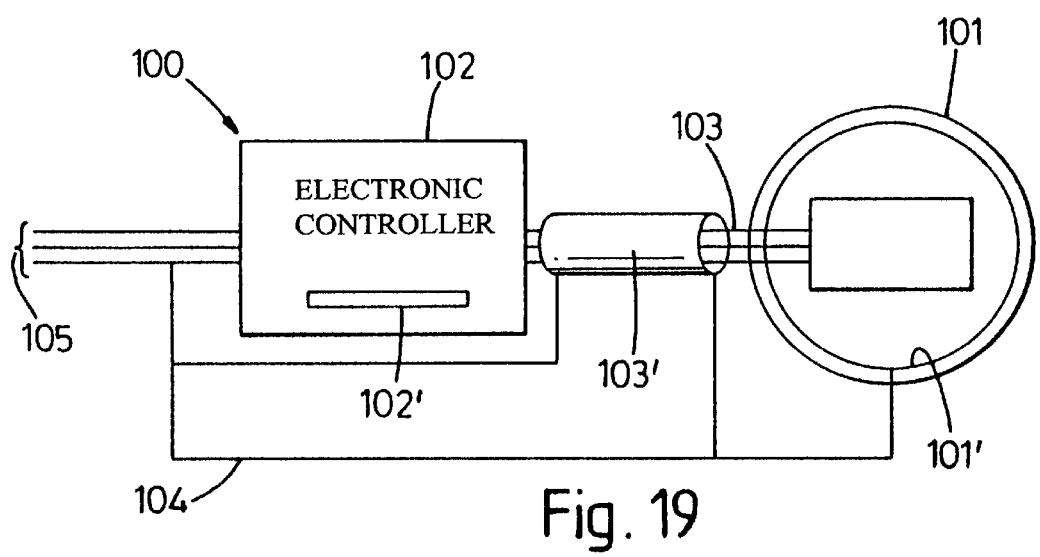
FIG. 19 shows in outline yet another electrical drive in accordance with the present invention.

FIG. 19 shows an electrical drive (100) of the type in which an electric motor (101) and an electronic controller (102) are interconnected by a cable (103). The motor, controller and cable are each provided with a respective screen section (101', 102', 103') and the three screen sections are interconnected by connector (104) which connects with the power input side (105) of the controller. Typically the motor screen section (101') may comprise a plurality of screen components (e.g. for the windings in core slots and for end windings) but alternatively it may be comprised by at least the frame structure of the motor. In an alternative arrangement it will be understood that the connector (104) may connect to an intermediate stage in the controller (102).

The degree of suppression of radio frequency emissions attainable by the present invention will either avoid the need to provide a filter or will allow use of a much smaller, and thus cheaper, filter and/or with less earth leakage current, than hitherto would have been necessary.

I claim:

1. A method for the suppression of radio frequency emissions from an electrical drive comprising an electronic controller comprising high speed switching means which generates high frequency energy and an electric motor to which power from a source of electrical power is supplied via said electronic controller, said method comprising providing an electric screen to receive radio frequency energy which, in use, is emitted from at least a part of the electrical drive; and electrically connecting said electrical screen back to a non-grounded position at an input side of said switching means.

2. A method according to claim 1, wherein said step of providing an electrical screen comprises arranging the electrical screen to substantially surround a part of the electric motor which emits radio frequency energy.

3. A method according to claim 1 wherein said method comprises electrically connecting said electrical screen back to a position which serves for the supply of electrical power to the switching means.

4. An electrical drive comprising at least a part which emits radio frequency energy, said electrical drive comprising an electronic controller comprising high speed switching means which generates high frequency energy, said switching means having an input side, an electric motor to which power from a source of electrical power is supplied via said electronic controller, and an electrical screen connected back to a non-grounded position at said input side of said switching means for receiving the radio frequency energy emitted by part of said electrical drive.

5. An electrical drive according to claim 4, and further comprising interconnection means provided between the electronic controller and the electric motor, wherein said electric motor and said interconnection means are devoid of a grounded screen.

6. An electrical drive according to claim 4 wherein said switching means includes an input side serving for the supply of electrical power to the switching means, and said electrical screen is connected to said input side.

7. An electrical drive according to claim 4 wherein the supply has a separate ground connection which is not connected to a pole of the power supply to the electrical drive.

8. An electrical drive according to claim 4, wherein said electrical screen is comprised by a part of the electric motor which is not connected to ground.

9. An electrical drive according to claim 8, wherein said electrical screen comprises a part of the electrical drive.

10. An electrical drive according to claim 4 wherein said electrical screen comprises a member additional to the structure of a conventional electrical drive.

11. An electrical drive according to claim 4 wherein said electrical screen substantially wholly surrounds at least a part of the electric motor emitting radio frequency energy.

12. An electrical drive according to claim 4, wherein said electric motor incorporates an electrical screen comprised by at least one of the frame, stator and rotor components of the motor and arranged to receive radio frequency energy emitted by electrical windings of said motor.

13. An electrical drive according to claim 4 and further comprising interconnection means for the transmission of power from the controller to the motor, each of the interconnection means, controller, and motor being provided with a screen to receive radio frequency energy emitted by at least a part of the respective interconnection means, controller and motor and each of said screens being connected back to the input side of the high speed switching means.

14. An electrical drive according to claim 4 and further comprising capacitor means connected between said electrical screen and the electronic controller or an external power supply to said controller, said capacitor means being arranged to ensure that the electrical screen is not connected directly to the external power supply or any other electrically live point and said capacitor means having a capacitance value which presents a low impedance at the frequencies associated with radio frequency emissions and a high impedance at the frequency of the external power supply.

15. An electrical drive according to claim 4 wherein said electronic controller has at least two stages, wherein one stage does not generate high frequency energy and said electrical screen is connected back to between said stages at a point which is at the input side of said stage(s) which generate(s) high frequency energy.

16. An electrical drive according to claim 4 wherein said electrical screen is an electrically conductive layer of a laminated construction comprising a layer of electrically conductive material having adjacent at least one surface thereof a layer of insulating material, said electrical screen being positioned at least in part between the motor windings and associated motor structure.

17. An electrical drive according to claim 4 wherein said electrical screen comprises a controller screen provided in proximity to the high speed switching means to receive radio frequency energy generated by said switching means, said controller screen being connected to the input side of said switching means.

18. An electrical drive according to claim 17, wherein said controller screen is positioned between ground and terminals of the high speed switching means.

19. An electrical drive according to claim 17 and further including a heat sink, wherein the high speed switching means is mounted on said heat sink and the controller screen is interposed between said high speed switching means and heat sink to provide a physical barrier to the direct transmission of radio frequency energy from the high speed switching means to the heat sink.

20. An electrical drive according to claim 17 wherein the controller screen substantially wholly contains the high speed switching means.

21. An electric motor comprising motor windings and a remaining structure, an electrical screen positioned between the motor windings and the remaining structure of the motor, said electrical screen being receptive to radio frequency energy emitted by the motor windings, a non-grounded electrically conductive connection means connected to said electrical screen, and electrical insulation means between said electrical screen and said remaining structure of the motor to electrically insulate said non-grounded connection means from said remaining structure of the motor.

22. An electric motor according to claim 21, and further comprising a plurality of slots, wherein the motor windings lie in each of said plurality of slots in a part of the motor structure, and wherein each of said slots has an electrical screen associated therewith and arranged to surround the windings in that slot.

23. An electric motor according to claim 22, wherein each said slot contains at least one electrical screen which surrounds the motor windings in that slot.

24. An electric motor according to claim 23, wherein each screen is a laminated screen which comprises a layer of electrically conductive material sandwiched between two layers of insulating material.

25. An electric motor according to claim 22, wherein the structure of a slot serves as part of an electrical screen associated with said slot.

26. An electric motor according to claim 25, wherein the mouth region of a slot contains a screen which is in electrical contact with respective side walls of the slot.

* * * * *